F. H. BOGGS.
Churn.

No. 168,218. Patented Sept. 28, 1875.

Another arrange.t
(Plan.)

a Third arrangement
(Plan.)

Witnesses
John Britton
Soranus Marston

Francis H. Boggs
by E. Thurlow Atty.

UNITED STATES PATENT OFFICE.

FRANCIS H. BOGGS, OF MONTGOMERY TOWNSHIP, WOODFORD COUNTY, ILLINOIS.

IMPROVEMENT IN CHURNS.

Specification forming part of Letters Patent No. 168,218, dated September 28, 1875; application filed June 29, 1875.

*To all whom it may concern:*

Be it known that I, FRANCIS H. BOGGS, of Montgomery township, in the county of Woodford, in the State of Illinois, have invented an Improvement in Churns; and do hereby declare that the following is a full, clear, and exact description thereof, reference being had to the annexed drawings making a part of this specification, in which like letters of reference refer to like parts, and in which—

Figure 1:
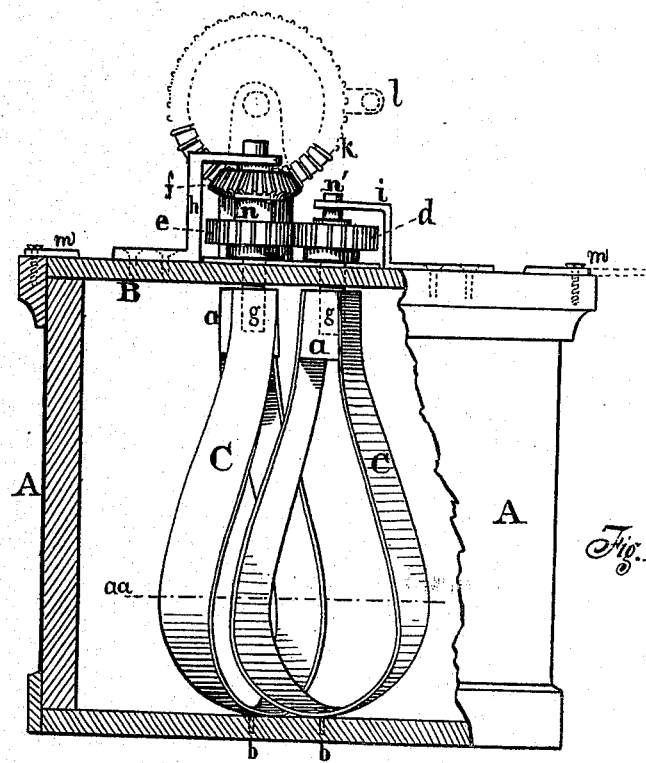
Figure 3:
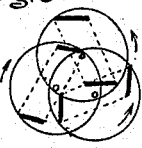
Figure 2:
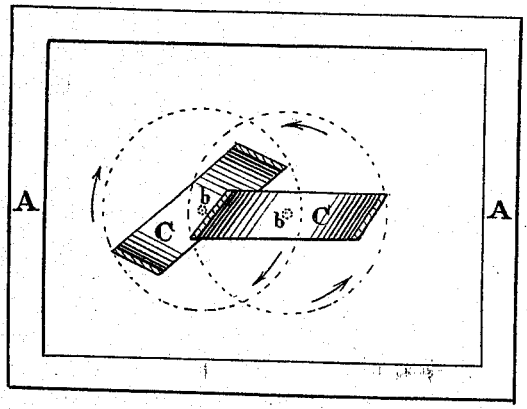
Figure 4:
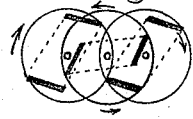

Figure 1 represents an elevation, with the side of the box removed to show the dashers; Fig. 2, a horizontal section of the dashers on dotted line *a a*, Fig. 1.

The object of my improvement is, first, to shorten the time of churning and obtaining butter; and, second, to produce a churn in which the gearing is readily and instantaneously disconnected from the dashers, so as to extricate them from the churn, and for extracting the butter.

The first object I attain by employing oblique-bladed dashers, of elliptic form, pivoted vertically, each within the revolutionary radius of its neighbor, on separate pivots, and geared together by pinions, in such a manner that the dasher-arms of the respective dashers revolve toward each other, (or in opposite directions,) each arm meeting the cream obliquely— *i. e.*, exerts an oblique compression upon the cream, at the same time that any undesirable tendency to a rotary motion of the body of the cream is destroyed by the combination, with said dashers, of a square box, the corners of which help to increase the agitation of the cream by throwing it back when thrown there by the blades of the dasher.

The dashers each consist of an elliptic strip of metal or other strong material, having a pivotal pin at the lower extremity, and at the upper end a rhomboidal block, *a*, which receives the end of a short shaft, *n'*, pivoted in the cover of the churn, each shaft being geared to its neighbor by a horizontal pinion. One of these shafts receives motion from a cogged wheel and winch mounted on the cover of the churn, so as to rotate the dashers simultaneously. I also use three dashers, pivoted in the same way, and in a line or in a triangular arrangement, and also use the blades, placed in such a way as to meet the cream at a right angle.

The principal advantage of this churn and dasher is that cream can be produced in five minutes, or so, with very little labor in rotating the dashers.

In the drawings, A is the box, which may be just large enough to allow the dashers to turn, or much larger, without detriment to the churning. It has two sockets in the bottom to admit the respective pins of the dashers. B is the cover, to which are attached the short shafts *n n'*, having square ends *g g* where they enter the sockets in the blocks *a* of each dasher. Said shafts are geared together by a pinion, *d e*, on each, and are supported by the arms *h i*, screwed to the cover B. One shaft has, in addition, a bevel or miter wheel, *f*, gearing with another, *k*, properly mounted, and operated by a winch, *l*. The cover is made removable by turning the buttons *m m* from off the edge of the same, carrying with it all the gearing, as the shafts readily lift out of the sockets in the dashers. C C are the dashers, each made of one piece of iron or other tough and inelastic material, bent into an ellipse, and attached above to the rhomboidal block *a*, which receives one of the shaft ends, and below in a short pivotal pin, *b*, which works in a socket in the bottom of the churn, so set that each dasher, in its revolution, revolves far within the circuit of its neighbor. Each dasher is bent in such a manner that each side or blade makes an oblique line with the circle described by the same.

What I claim as my invention is—

The elliptical dasher-blades C C, attached to rhomboidal blocks *a*, the ends of the blades being secured to the parallel faces of the blocks, the edges of the blades coinciding with the vertical edges of the blocks, causing the blades to take a twisted form, in combination with a rotating shaft, substantially as specified.

In testimony that I claim the foregoing churn I have hereunto set my hand this 7th day of June, A. D. 1875.

FRANCIS H. BOGGS.

Witnesses:
G. L. HUXTABLE,
JOHN BRITTON.